(12) United States Patent
Maushart et al.

(10) Patent No.: US 8,007,209 B2
(45) Date of Patent: Aug. 30, 2011

(54) MILLING TOOL FOR THE PROCESSING OF WORKPIECES BY CUTTING

(75) Inventors: Josef Maushart, Schweiz (CH); Tiziano Sichi, Schweiz (CH)

(73) Assignee: Fraisa Holding AG, Bellach (CH)

( * ) Notice: Subject to any disclaimer, the term of this patent is extended or adjusted under 35 U.S.C. 154(b) by 763 days.

(21) Appl. No.: 11/845,974

(22) Filed: Aug. 28, 2007

(65) Prior Publication Data

US 2008/0069650 A1 Mar. 20, 2008

(30) Foreign Application Priority Data

Aug. 28, 2006 (EP) .................................. 06119653

(51) Int. Cl.
*B23C 1/10* (2006.01)
*B23C 5/10* (2006.01)
(52) U.S. Cl. ........................................ 407/54; 407/53
(58) Field of Classification Search .................... 407/53, 407/60–63
See application file for complete search history.

(56) References Cited

U.S. PATENT DOCUMENTS

| 4,560,308 | A | * | 12/1985 | Deller | 407/53 |
| 4,770,567 | A | * | 9/1988 | Moriarty | 407/59 |
| 5,193,944 | A | * | 3/1993 | Nishimura | 407/53 |
| 6,164,876 | A | * | 12/2000 | Cordovano | 407/59 |
| 2004/0258489 | A1 | * | 12/2004 | Volokh | 407/53 |
| 2008/0206003 | A1 | * | 8/2008 | Flynn | 407/54 |

FOREIGN PATENT DOCUMENTS

| DE | 3440606 A1 | | 5/1986 |
| DE | 3706282 A1 | | 9/1987 |
| DE | 10325600 A1 | | 1/2005 |
| DE | 202004015757 | * | 8/2005 |
| DE | 102005002698 A1 | | 7/2006 |
| EP | 0506098 A1 | | 9/1992 |
| JP | 2002233910 A | | 8/2002 |

OTHER PUBLICATIONS

International Search Report for Application No. EP 06119653.

* cited by examiner

*Primary Examiner* — Will Fridie, Jr.
(74) *Attorney, Agent, or Firm* — Pearne & Gordon LLP (57) ABSTRACT

A milling tool for the processing of workpieces by cutting is provided with multiple cutting flanks (3) and flutes (4) arranged in between these. The cutting flanks (3) have cutting edges (6) along the cutting side (5) of which bezels (10) are provided. At least one bezel (10) extending along a cutting edge (6) has an effective cutting angle ($y_2$) that differs from the effective cutting angles ($y_2'$, $y_2''$, ...) of the bezels (10) extending along the further cutting edges (6). This asymmetric arrangement of the bezels (10) in a tool results in a calmer running of the tool which impacts the surface quality of the processed surface and results in a better serviceable life of the tool.

10 Claims, 6 Drawing Sheets

MILLING TOOL FOR THE PROCESSING OF WORKPIECES BY CUTTING

The present invention relates to a milling tool for the processing of workpieces by cutting that is provided with multiple cutting flanks and flutes arranged in between these, whereby said cutting flanks have cutting edges along the cutting side of which bezels are provided that have a wedge angle that is more obtuse than the wedge angle of the cutting edges.

Milling tools of this type are known. In order for tools of this type to achieve high performance, these are manufactured, e.g., from hard metal, HSS or ceramic materials. The brittleness of this material is relatively high. Accordingly, the use of these tools is associated with an increased risk of chipping at the cutting edges in particular during the processing of tough materials. This strongly impairs the performance of the corresponding tools.

In order to strongly reduce this type of wear and tear of the tools, bezels are provided on the cutting side of the cutting edges whose wedge angle is more obtuse than the wedge angle of the cutting edge. Providing a bezel of this type results in the cutting wedge being strengthened which massively reduces the risk of chipping at the cutting edges. This increases the serviceable life of these tools.

Tools of this type may have a tendency to generate vibrations during a processing process, which, in the extreme, may be expressed in the form of a whistling sound. However, vibrations on the tool also mean poorer quality of the processed surfaces, but they also mean that the serviceable life of the tools is poorer.

It is therefore the object of the invention to improve tools of this type such that the vibrations are prevented to the extent possible.

This object is solved according to the invention by at least one bezel extending along a cutting edge having an effective cutting angle that differs from the effective cutting angles of the bezels extending along the further cutting edges.

By means of this simple measure, asymmetry of the cutting edges on the tool is obtained, which allows vibrations building-up to be suppressed effectively.

Advantageously, all bezels extending along a cutting edge have different effective cutting angles, whereby the desired asymmetry is increased.

Advantageously, the effective cutting angles of the bezels are in the range from 0 to −30°. An optimal rate of metal removal and a long serviceable life of the tool are attained in these effective cutting angle ranges.

The cutting flanks can have smooth cutting edges, but the cutting flanks can also have a wave-shaped profile that extends across the width of the cutting flanks, depending on the intended purpose of the tool.

Advantageously, each bezel extends at least over a part of the height of the wave crests of the wave-shaped profile, whereby optimal reinforcement of the wave crests is attained.

According to a further advantageous development of the invention, the cutting edges of the cutting flanks have different angles of twist. This increases the aspect of asymmetry which renders the tool less sensitive to vibration-inducing stimuli.

The cutting edges of the cutting flanks can also be provided with bulges that extend into the flutes such that the angle of twist along a cutting edge takes on different magnitudes. This prevents adhesion of the chips and has a chip-breaking effect. The serviceable life of the tools are thus improved.

Advantageously, the surface of the bezel has lower roughness than the surface of the flutes. As a consequence, the chips produced in the processing are guided-off in an optimal fashion.

Embodiments of the invention are illustrated in more detail in the following in an exemplary fashion by means of the appended drawing.

In the figures:

FIG. 3 is a partial view of the section along the line, III-III, according to the milling tool according to the invention that is shown in FIG. 1;

FIG. 4b is a partial view of the section along the line, IV-IV, according to the milling tool according to the invention that is shown in FIG. 4a;

Figure 1:
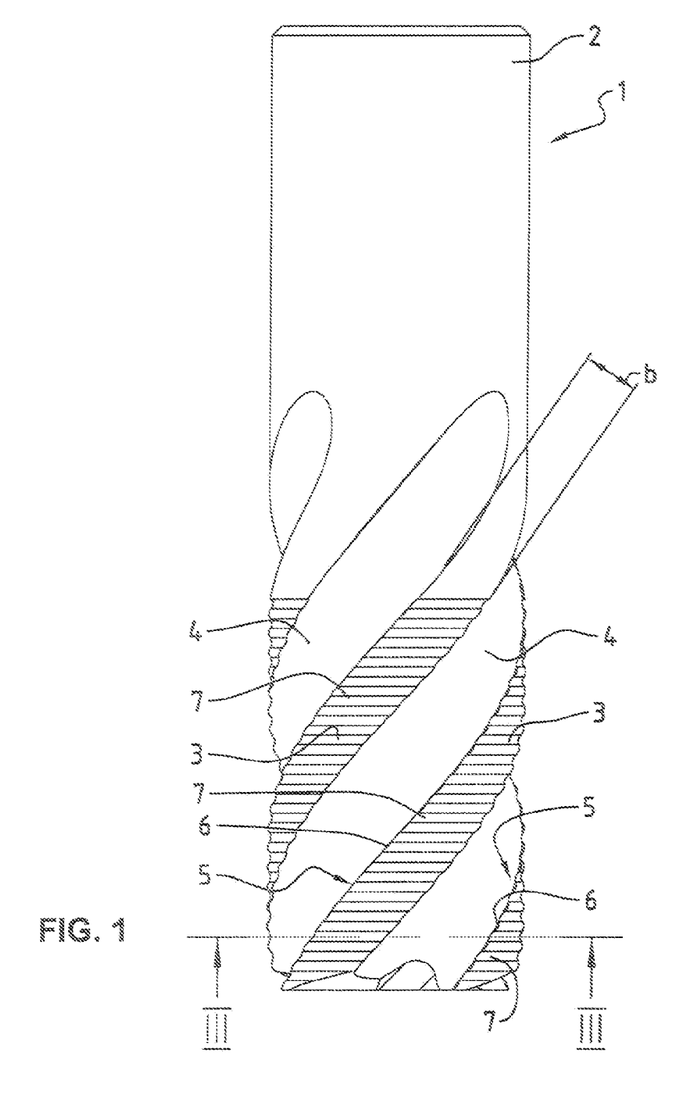
FIG. 1 shows a view onto a milling tool according to the invention having profiled cutting flanks.

FIG. 1 shows a first embodiment of a milling tool 1 that is suitable for the rough-machining of workpieces. This milling tool 1 has a cylindrical shaft 2 having flutes 4 arranged in its lower part. The cutting flanks 3 are disposed between the flutes 4. The flutes 4, and therefore the cutting flanks 3, are arranged in spiral shape in known fashion and thus have a so-called angle of twist. On the cutting side 5, the cutting flanks 3 are provided with cutting edges 6 that are provided with a predetermined effective cutting angle. Each of the cutting edges 6 is provided with a wavy line-shaped profile 7 that extends over the entire width b of the cutting flanks 3. Wavy line-shaped profiles of this type are known, for example, by the names, "NRF", "NRC", "MR", "WRC" or "NF".

This milling tool 1 can be clamped into a corresponding machine tool by its cylinder-shaped shaft 2 in known fashion, after which the workpiece can be processed in a milling process.

Figure 2A:
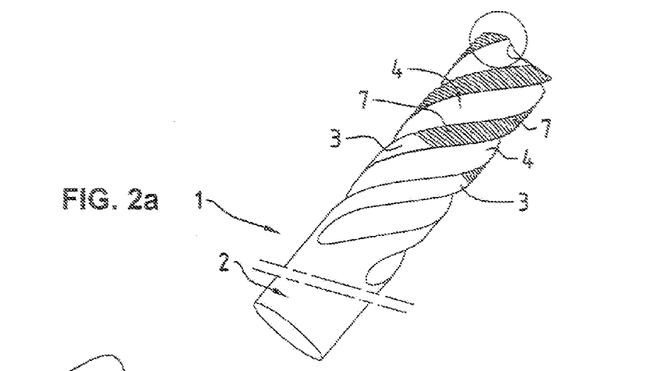
FIG. 2a shows a spatial representation of this milling tool according to the invention.

FIG. 2a shows a spatial representation of the milling tool according to the invention according to FIG. 1 having the cylindrical shaft, the cutting flanks 3, the flutes 4, and the wavy line-shaped profile 7. A part of the front zone of this tool 1 that is circled in FIG. 2a is shown magnified in FIG. 2b.

Figure 2B:
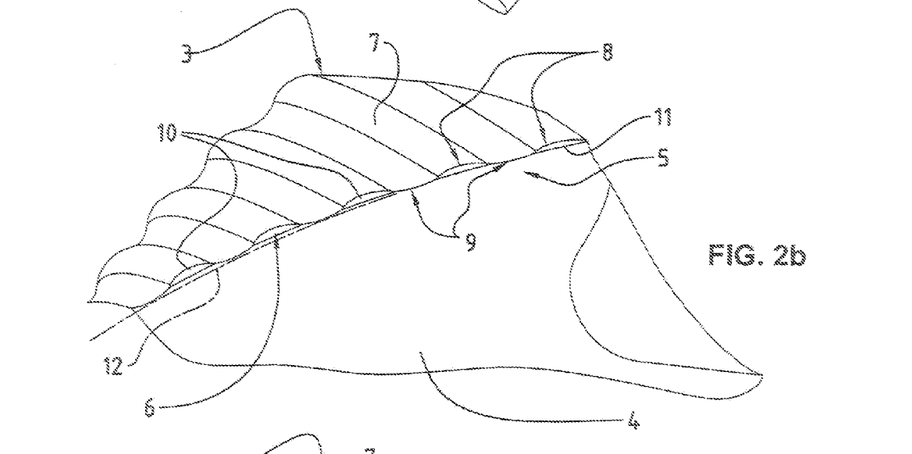
FIG. 2b shows a magnified representation of the part circled in FIG. 2a of the milling tool according to the invention.

FIG. 2b shows a part of a cutting flank 3 over which the wavy line-shaped profile 7 extends. This cutting flank 3 is directly adjacent to a flute 4 of which only part is evident in this FIG. 2b. The cutting edge 6 is visualized on the cutting side 5 of the cutting flank 3 shown in this figure. Due to profile 7 on the cutting flank 3 being wavy line-shaped, this cutting edge has a wavy line shape with wave crests 8 and wave troughs 9. The bezel 10 is beveled in the upper part of the wave crests 8. Solid line 11 depicts the exemplary embodiment, in which the bezel 10 extends over only an upper part of the wave crests 8. On the left side of FIG. 2b, dashed line 12 depicts an exemplary embodiment, in which the bezel 10 extends over the entire height of the wave crests 8.

Figure 2C:
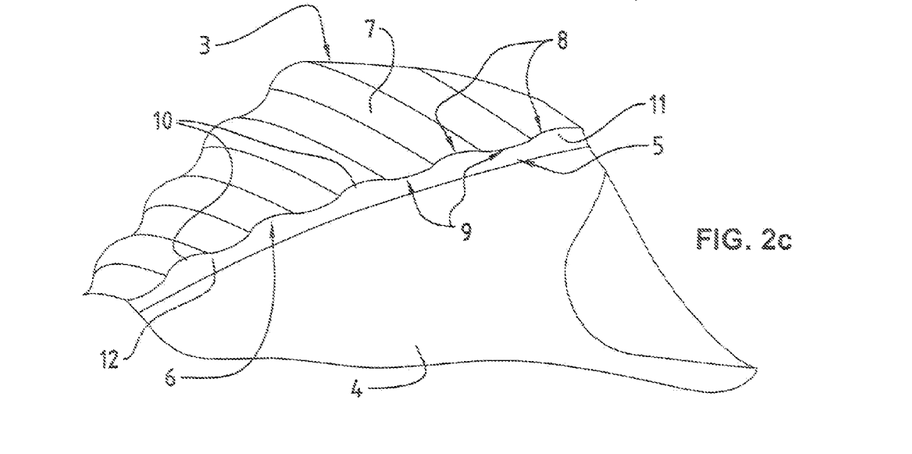
FIG. 2c shows a magnified representation of the part circled in FIG. 2a of a milling tool according to the invention having a different design.

FIG. 2c shows an embodiment of the tool according to FIG. 1 and FIG. 2a, in which the width of the bezel exceeds the height of the wave crests. Accordingly, the base line of the bezel 10 is disposed in the flute 4 below the wave troughs 9.

Figure 3:
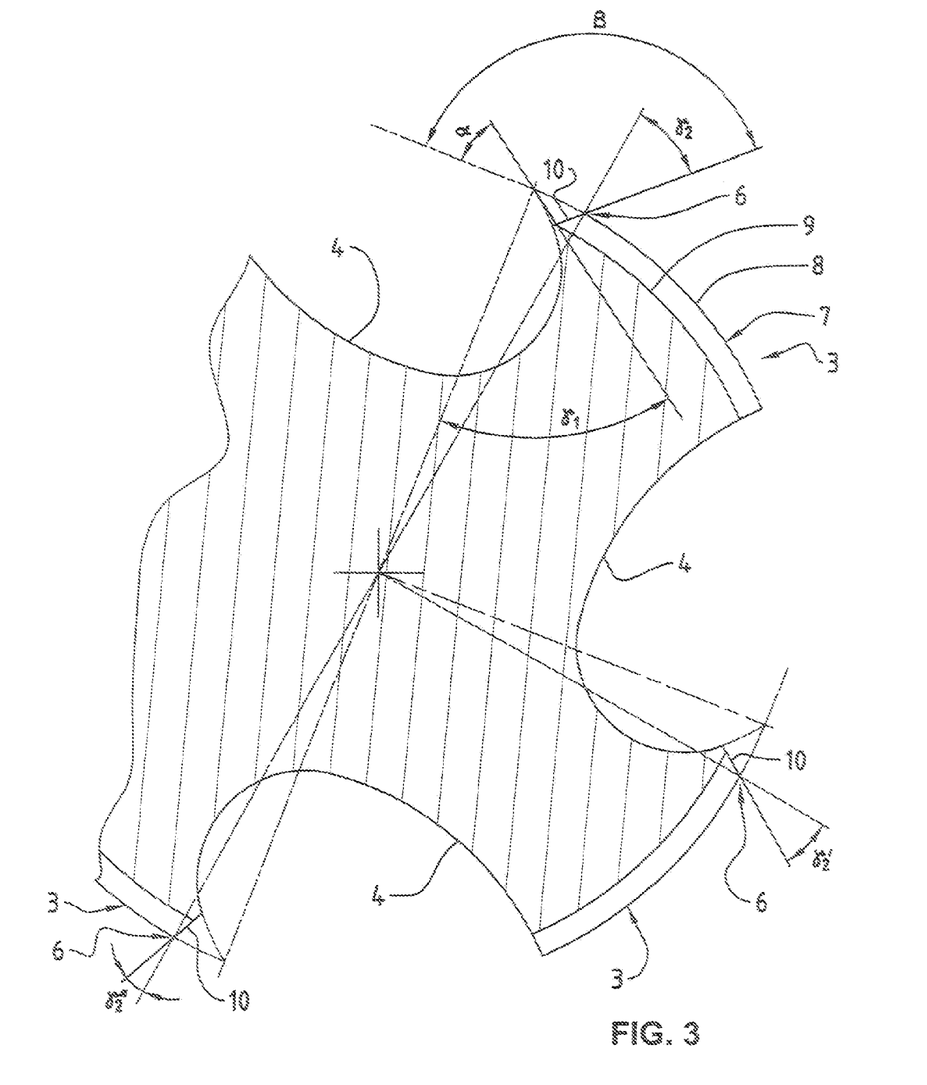

Three cutting flanks 3 of the total of four cutting flanks shown by the exemplary embodiment shown in FIG. 3 are evident in the sectional representation of FIG. 3. The flute 4 is arranged between each of the cutting flanks 3. Also evident are the wave crests 8 and the wave troughs 9 of the wavy line-shaped profile 7 that extends over the entire cutting flank 3. The corresponding bezel 10 that is provided in the area of the cutting edge 6 is also evident in FIG. 3.

In FIG. 3, the respective angles for the cutting edge 6 that is shown in the top of this figure, are specified. The angle, $y_1$, shows the effective cutting angle of the milling tool in case no bezel 10 was provided. The angle, $\alpha$, shows the wedge angle of the milling tool without the bezel being provided. The angle, $\beta$, shows the wedge angle formed by the tool having the beveled bezel 10. The angle, $y_2$, shows the effective cutting angle of the bezel 10.

The effective cutting angle, $y_2$, of the first cutting edge 6 of this tool, the effective cutting angle, $y_2'$, of the second cutting edge 6 of this tool, and the effective cutting angle, $y_2''$, of the third cutting edge 6 of this tool each are of different magnitude. Advantageously, the magnitude of these angles is between $-20°$ and $-30°$. In the four-edged tool shown here, they can, for example, be arranged such that the first cutting edge has an effective cutting angle of $-20°$, the effective cutting angle of the second cutting edge is, for example, $-25°$, the effective cutting angle of the third cutting edge is, for example, $-20°$, and the effective cutting angle of the fourth cutting edge is, for example, $-28°$. It is self-evident that other gradations may be used as well.

The bezels 10 are advantageously provided such that the cutting edge 6 always has the same position with respect to the cutting flank 3. This means that, viewed along the circumference of the tool, the cutting edges 6 always are disposed at an identical distance from each other. Accordingly, the radius of the cutting edges is always absolutely identical regardless which tool orthogonal clearance the cutting flanks have. Accordingly, the different effective cutting angles, $y_2$, $y_2'$, $y_2''$, . . . result in a different width of the bezels 10.

Figure 4A:
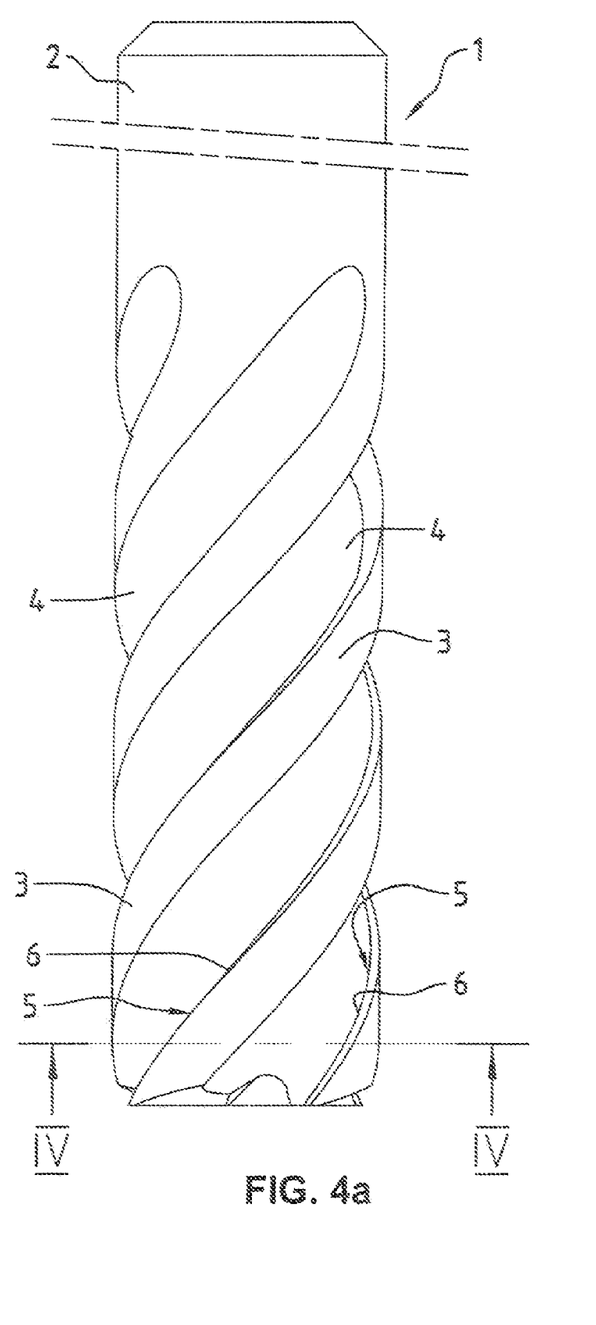
FIG. 4a shows a view onto a milling tool according to the invention having smooth cutting edges.

FIG. 4a shows a view onto another embodiment of a milling tool 1 according to the invention, whereby the same reference numbers are used for identical parts as in the previous figures. As before, this milling tool 1 has a cylindrical shaft 2 the lower part of which also is provided with flutes 4 between which the cutting flanks 3 are disposed. As before, the flutes 4, and therefore the cutting flanks 3, are arranged to have spiral shape and each forms an angle of twist. On the cutting side 5, the cutting flanks 3 are provided with cutting edges 6 that are provided with a predetermined effective cutting angle. In contrast to the preceding exemplary embodiment, the cutting flanks have a smooth surface, meaning that the cutting edges 6 are also provided to be smooth. As before, this milling tool can be clamped into a machine tool by its cylinder-shaped shaft 2 in known fashion for processing of the workpiece.

Figure 4B:
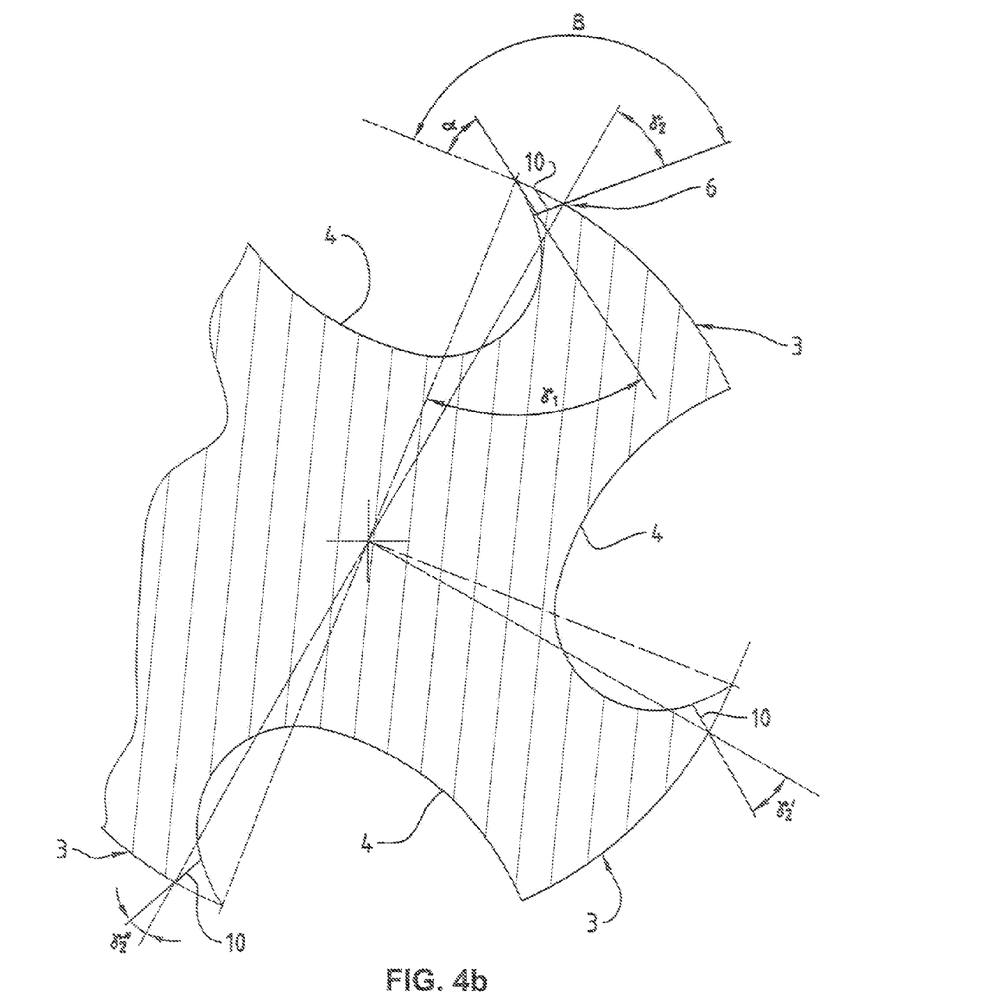

FIG. 4b shows a representation of a section through the tool according to FIG. 4a, whereby this FIG. 4b is provided according to FIG. 3. As before, three cutting flanks 3 of the total of four cutting flanks of this tool are evident. As before, the flutes 4 are arranged between each of the cutting flanks 3. As before, each bezel 10 is provided in the area of the cutting edges 6. The angles shown herein correspond to the angles specified in FIG. 3: the angle, $y_1$, shows the effective cutting angle of the cutting flank of the milling tool in case no bezel 10 was provided, the angle, $\alpha$, shows the wedge angle the milling tool would have with no bezel 10 being provided, the angle, $\beta$, shows the wedge angle formed by the milling tool having the beveled bezel 10, and the angle, $y_2$, shows the effective cutting angle of the bezel 10.

Like in the embodiment according to FIG. 3, the effective cutting angles $y_2$, $y_2'$, and $y_2''$, differ in magnitude and can be provided in the same fashion as was described in FIG. 3. The bezels 10 are provided to have a width that is less than 5% of the diameter of the milling tool.

In these milling tools presented above, the bezel 10 can be manufactured using a single surface grinding process along the cutting edge 6. Advantageously, the surface of the bezel is ground to be very fine, for example to have a roughness of better than 0.05 μm such that its surface roughness is lower than that of the surface of the flutes; this allows the chips processed off the workpiece to slide-off in an optimal fashion. It is also conceivable to provide the surface roughness of the ground surface of the bezel and the ground surface of the flutes to be basically identical and to be very low. However, this is associated with the disadvantage that the manufacture of the flutes becomes more expensive the finer their surface is. On the other hand, the manufacture of this bezel 10 is very simple and therefore inexpensive.

Figure 6:
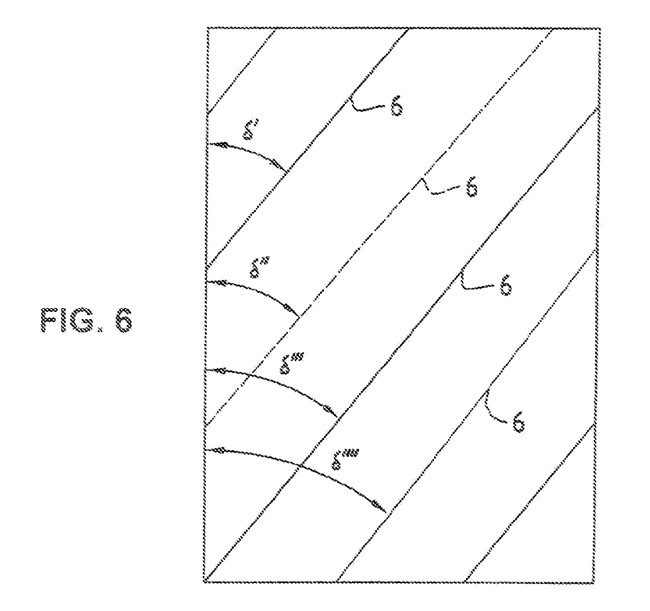
FIG. 6 shows cutting edges of a milling tool, depicted in a plane, having different angles of twist.

FIG. 6 shows the cutting edges 6 of a milling tool according to the invention in a position of being uncoiled into a plane. These cutting edges have a so-called angle of twist 6. This angle of twist $\delta$ can be identical for all cutting edges 6 of a milling tool. However, the angle of twist $\delta$ of the individual cutting edges 6 of a milling tool can also be of different magnitude for each cutting flank, such as is shown in FIG. 6. The angles of twist, $\delta'$, $\delta''$, $\delta'''$, and $\delta''''$, can assume different magnitudes: for example, $\delta'$ and $\delta''$ can be 39.5°, $\delta''$ can be 41°, and $\delta''$ can be 38°. It is self-evident that other suitable magnitudes are also conceivable. This arrangement increases the desired asymmetry of the tool which improves the properties that are described above and are to be attained even more.

Figure 5:
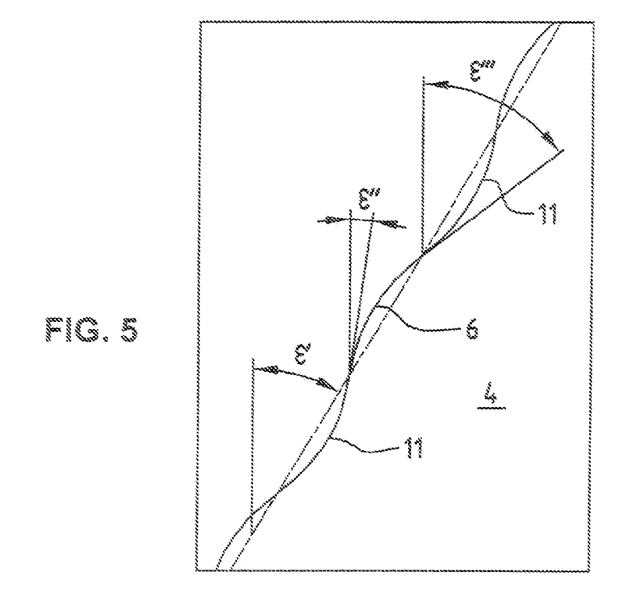
FIG. 5 shows a view of a cutting edge, uncoiled in a plane, that has angles of twist differing in magnitude along this cutting edge.

FIG. 5 also shows a cutting edge 6 of a milling tool uncoiled into a plane. This cutting edge 6 is provided to be wave-shaped, which generates bulges 11 that protrude into the flutes. As a result, angles of twist, $\epsilon'$, $\epsilon''$, and $\epsilon'''$, are obtained that differ in magnitude and extend along a cutting edge 6 as is evident from FIG. 5. This prevents adhesion of the chips and has a chip-breaking effect. It is clear that the provision of the bezels 10 requires increased effort in this embodiment.

With these further developments of the cutting edges on milling tools for the processing of workpieces one achieves not only reinforcement of the cutting edges with the advantageous corollary that chipping of the cutting edge, otherwise known to occur, is prevented to a significant extent, but also a more even running of the tools. The occurrence of vibrations can be reduced massively which leads to improved surface qualities of the worked surfaces and improved serviceable lives of the tools.

The invention claimed is:

1. Milling tool for the processing of workpieces by cutting that is provided with multiple cutting flanks (3) and flutes (4) arranged in between these, whereby said cutting flanks (3) have cutting edges (6) along the cutting side (5) of which bezels (10) are provided that have a wedge angle ($\beta$) that is more obtuse than the wedge angle ($\alpha$) of the cutting edges (6), wherein at least one bezel (10) extending along a cutting edge (6) has an effective cutting angle ($y_2$) that differs from the effective cutting angles ($y_2'$, $y_2''$, . . . ) of the bezels (10) extending along the further cutting edges (6).

2. Milling tool according to claim 1, wherein all bezels (10) extending along a cutting edge (6) have a different effective cutting angle ($y_2, y_2', y_2'', \ldots$).

3. Milling tool according to claim 1 or 2, wherein the effective cutting angle ($y_2, y_2', y_2'', \ldots$) of the bezels (10) is in the range from 0° to −30°.

4. Milling tool according to any one of the claim 1 or 2, wherein the cutting flanks (3) have smooth cutting edges (6).

5. Milling tool according to any one of the claim 1 or 2, wherein the cutting edges (6) have a wave-shaped profile (7) that extends over the width of the cutting flanks (3).

6. Milling tool according to claim 5, wherein the respective bezel (10) extends over at least a part of the height of the wave crests (8) of the wave-shaped profile (7).

7. Milling tool for the processing of workpieces by cutting that is provided with multiple cutting flanks (3) and flutes (4) arranged in between these, whereby said cutting flanks (3) have cutting edges (6) along the cutting side (5) of which bezels (10) are provided that have a wedge angle (13) that is more obtuse than the wedge angle ($\alpha$) of the cutting edges (6), wherein at least one bezel (10) extending along a cutting edge (6) has an effective cutting angle ($y_2$) that differs from the effective cutting angles ($y_2', y_2'', \ldots$) of the bezels (10) extending along the further cutting edges (6), and wherein the cutting edges (6) of the cutting flanks (3) have different angles of twist ($\delta$).

8. Milling tool for the processing of workpieces by cutting that is provided with multiple cutting flanks (3) and flutes (4) arranged in between these, whereby said cutting flanks (3) have cutting edges (6) along the cutting side (5) of which bezels (10) are provided that have a wedge angle ($\beta$) that is more obtuse than the wedge angle ($\alpha$) of the cutting edges (6), wherein at least one bezel (10) extending along a cutting edge (6) has an effective cutting angle ($y_2$) that differs from the effective cutting angles ($y_2', y_2'', \ldots$) of the bezels (10) extending along the further cutting edges (6), and wherein the cutting edges (6) of the cutting flanks (3) are provided with bulges (11) that protrude into the flutes (4) such that the angle of twist ($\epsilon$) that each extends along a cutting edge (6) has different magnitudes.

9. Milling tool according to claim 1, wherein the surface of the bezel (10) has lower roughness than the surface of the flutes (4).

10. Milling tool according to claim 1, wherein the effective cutting angle ($y_2$) of the cutting edge (6) is constant over the entire length of the cutting edge (6).

\* \* \* \* \*

UNITED STATES PATENT AND TRADEMARK OFFICE
CERTIFICATE OF CORRECTION

PATENT NO. : 8,007,209 B2  
APPLICATION NO. : 11/845974  
DATED : August 30, 2011  
INVENTOR(S) : Josef Maushart et al.

Page 1 of 1

It is certified that error appears in the above-identified patent and that said Letters Patent is hereby corrected as shown below:

On the title page item [75], Inventor Maushart's city should be Solothurn (CH).

On the title page item [75], Inventor Sichi's city should be Luterbach (CH).

At Col. 4, Line 27, replace "twist δ" with "twist $\delta$".

At Col. 4, Line 33, replace the phrase "$\delta'$ and $\delta''$ can be 39.5°" with the phrase "$\delta'$ and $\delta'''$ can be 39.5°".

At Col. 4, Line 34, replace the phrase "and $\delta''$ can be 38°" with the phrase "and $\delta''''$ can be 38°".

In Claim 7 at Col. 5, Line 20, replace "wedge angle (13)" with "wedge angle ($\beta$)".

Signed and Sealed this  
Fifth Day of February, 2013

Teresa Stanek Rea  
*Acting Director of the United States Patent and Trademark Office*